(12) United States Patent
Wei et al.

(10) Patent No.: US 11,705,751 B1
(45) Date of Patent: Jul. 18, 2023

(54) SYSTEMS AND METHODS FOR MANAGING AN ENERGY-STORAGE DEVICE

(71) Applicant: SCHNEIDER ELECTRIC IT CORPORATION, Foxboro, MA (US)

(72) Inventors: Xia Wei, Shanghai (CN); Chenlei Bao, Shanghai (CN); Tongfei Zhang, Shanghai (CN); Jingli Liu, Shanghai (CN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 18/051,178

(22) Filed: Oct. 31, 2022

Related U.S. Application Data

(63) Continuation of application No. PCT/CN2022/009013, filed on Apr. 29, 2022.

(51) Int. Cl.
*H02J 7/00* (2006.01)
*H02J 3/32* (2006.01)
(Continued)

(52) U.S. Cl.
CPC .......... *H02J 7/007182* (2020.01); *H02J 3/32* (2013.01); *H02J 7/00032* (2020.01); *H02J 7/02* (2013.01); *H02J 9/062* (2013.01); *H02J 2207/20* (2020.01)

(58) Field of Classification Search
CPC .... H02J 7/007182; H02J 3/32; H02J 7/00032; H02J 7/02; H02J 9/062; H02J 2207/20
See application file for complete search history.

(56) References Cited

U.S. PATENT DOCUMENTS

| | | | |
|---|---|---|---|
| 6,507,173 B1 | 1/2003 | Spiridon et al. | |
| 2015/0236535 A1* | 8/2015 | Suzuki | H02J 7/0029 320/112 |

(Continued)

FOREIGN PATENT DOCUMENTS

| CN | 1853328 A | 10/2006 |
|---|---|---|
| CN | 110780208 A | 2/2020 |

(Continued)

OTHER PUBLICATIONS

Notification of Transmittal of the International Search Report and the Written Opinion of the International Searching Authority from corresponding PCT/CN2022/090138 dated Dec. 28, 2022.

(Continued)

*Primary Examiner* — Toan T Vu
(74) *Attorney, Agent, or Firm* — Lando & Anastasi, LLP

(57) ABSTRACT

Aspects of the disclosure include a power system comprising a power-supply device having an output, the power-supply device being configured to provide output power to the output of the power-supply device, and control circuitry configured to receive voltage information indicative of a voltage of a battery, determine that the voltage of the battery is above a first voltage threshold, activate a shutdown signal responsive to determining that the voltage of the battery is above the first voltage threshold, determine that the voltage of the battery is below a second voltage threshold, the second voltage threshold being less than the first voltage threshold, control the power-supply device to disable the output power to the output of the power-supply device responsive to determining that the voltage of the battery is below the second voltage threshold and that the shutdown signal is activated, and control the power-supply device to provide the output power to the output of the power-supply device responsive to determining that the voltage of the (Continued)

battery is below the second voltage threshold and that the shutdown signal is not activated.

20 Claims, 10 Drawing Sheets

(51) Int. Cl.
    *H02J 7/02*           (2016.01)
    *H02J 9/06*           (2006.01)

(56) References Cited

U.S. PATENT DOCUMENTS

| | | | |
|---|---|---|---|
| 2018/0034267 A1* | 2/2018 | Vasefi | H01M 10/0525 |
| 2022/0069365 A1 | 3/2022 | Ingurthi et al. | |

FOREIGN PATENT DOCUMENTS

| | | |
|---|---|---|
| CN | 112865578 A | 5/2021 |
| CN | 113013978 A | 6/2021 |

OTHER PUBLICATIONS

Written Opinion of the International Searching Authority from corresponding PCT/CN2022/090138 dated Dec. 28, 2022.

\* cited by examiner

SYSTEMS AND METHODS FOR MANAGING AN ENERGY-STORAGE DEVICE

CROSS-REFERENCE TO RELATED APPLICATION

This application is a continuation of International Application No. PCT/CN2022/090138 filed on Apr. 29, 2022, titled SYSTEMS AND METHODS FOR MANAGING AN ENERGY-STORAGE DEVICE, which is hereby incorporated herein by reference in its entirety for all purposes.

BACKGROUND

1. Field of the Disclosure

At least one example in accordance with the present disclosure relates generally to power supplies.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

According to at least one aspect of the present disclosure, a power system is provided comprising a power-supply device having an output, the power-supply device being configured to provide output power to the output of the power-supply device, and control circuitry configured to receive voltage information indicative of a voltage of a battery, determine that the voltage of the battery is above a first voltage threshold, activate a shutdown signal responsive to determining that the voltage of the battery is above the first voltage threshold, determine that the voltage of the battery is below a second voltage threshold, the second voltage threshold being less than the first voltage threshold, control the power-supply device to disable the output power to the output of the power-supply device responsive to determining that the voltage of the battery is below the second voltage threshold and that the shutdown signal is activated, and control the power-supply device to provide the output power to the output of the power-supply device responsive to determining that the voltage of the battery is below the second voltage threshold and that the shutdown signal is not activated.

In some examples, the control circuitry is further configured to determine that the voltage of the battery is below a third voltage threshold, the third voltage threshold being less than the second voltage threshold, and control the power-supply device to disable the output power to the output of the power-supply device responsive to determining that the voltage of the battery is below the third voltage threshold. In various examples, the control circuitry is further configured to deactivate the shutdown signal responsive to controlling the power-supply device to disable the output power to the output of the power-supply device. In at least one example, the control circuitry is further configured to receive a start-up signal, and determine whether the voltage of the battery is above the first voltage threshold responsive to receiving the start-up signal.

In some examples, the control circuitry is further configured to maintain the shutdown signal deactivated responsive to determining that the voltage of the battery is below the first voltage threshold. In various examples, the control circuitry includes a first comparator configured to compare the voltage of the battery to the first voltage threshold. In at least one example, the control circuitry includes a latch circuit having an input coupled to an output of the first comparator, and an output. In some examples, the first comparator is configured to provide a first shutdown signal to the latch circuit responsive to determining that the voltage of the battery is above the first voltage threshold, the latch circuit is configured to output a latched shutdown signal at the output of the latch circuit responsive to receiving the first shutdown signal from the first comparator, and activating the shutdown signal includes outputting the latched shutdown signal.

In various examples, the control circuitry includes an AND gate having a first input coupled to the output of the latch circuit, and a second input. In at least one example, the control circuitry includes a second comparator having an output configured to be coupled to the second input of the AND gate, and the second comparator is configured to provide a second shutdown signal to the second input of the AND gate responsive to determining that the voltage of the battery is less than the second voltage threshold. In some examples, the AND gate is configured to control the power-supply device to disable the output power to the output of the power-supply device responsive to receiving a latched shutdown signal from the first comparator and receiving the second shutdown signal from the second comparator.

In various examples, the control circuitry includes an OR gate having a first input coupled to an output of the AND gate, and a second input. In at least one example, the control circuitry includes a third comparator configured to compare the voltage of the battery to a third voltage threshold. In some examples, the third comparator is configured to output a third shutdown signal to the second input of the OR gate responsive to determining that the voltage of the battery is less than the third voltage threshold.

According to at least one aspect of the disclosure, a non-transitory computer-readable medium storing thereon sequences of computer-executable instructions for operating a power system including a power-supply device having an output, the power-supply device being configured to provide output power to the output of the power-supply device is provided, the sequences of computer-executable instructions including instructions that instruct at least one processor to receive voltage information indicative of a voltage of a battery, determine that the voltage of the battery is above a first voltage threshold, activate a shutdown signal responsive to determining that the voltage of the battery is above the first voltage threshold, determine that the voltage of the battery is below a second voltage threshold, the second voltage threshold being less than the first voltage threshold, control the power-supply device to disable the output power to the output of the power-supply device responsive to determining that the voltage of the battery is below the second voltage threshold and that the shutdown signal is activated, and control the power-supply device to provide the output power to the output of the power-supply device responsive to determining that the voltage of the battery is below the second voltage threshold and that the shutdown signal is not activated.

In some examples, the instructions further instruct the at least one processor to determine that the voltage of the battery is below a third voltage threshold, the third voltage threshold being less than the second voltage threshold, and control the power-supply device to disable the output power to the output of the power-supply device responsive to determining that the voltage of the battery is below the third voltage threshold. In various examples, the instructions further instruct the at least one processor to deactivate the shutdown signal responsive to controlling the power-supply device to disable the output power to the output of the power-supply device. In at least one example, the instructions further instruct the at least one processor to receive a start-up signal, and determine whether the voltage of the battery is above the first voltage threshold responsive to receiving the start-up signal. In some examples, the instructions further instruct the at least one processor to maintain the shutdown signal deactivated responsive to determining that the voltage of the battery is below the first voltage threshold.

According to at least one aspect of the disclosure, a method of operating a power-supply system having a power-supply device and being configured to provide output power to an output of the power-supply device is provided, the method comprising receiving voltage information indicative of a voltage of a battery, determining that the voltage of the battery is above a first voltage threshold, activating a shutdown signal responsive to determining that the voltage of the battery is above the first voltage threshold, determining that the voltage of the battery is below a second voltage threshold, the second voltage threshold being less than the first voltage threshold, controlling the power-supply device to disable the output power to the output of the power-supply device responsive to determining that the voltage of the battery is below the second voltage threshold and that the shutdown signal is activated, and controlling the power-supply device to provide the output power to the output of the power-supply device responsive to determining that the voltage of the battery is below the second voltage threshold and that the shutdown signal is not activated.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
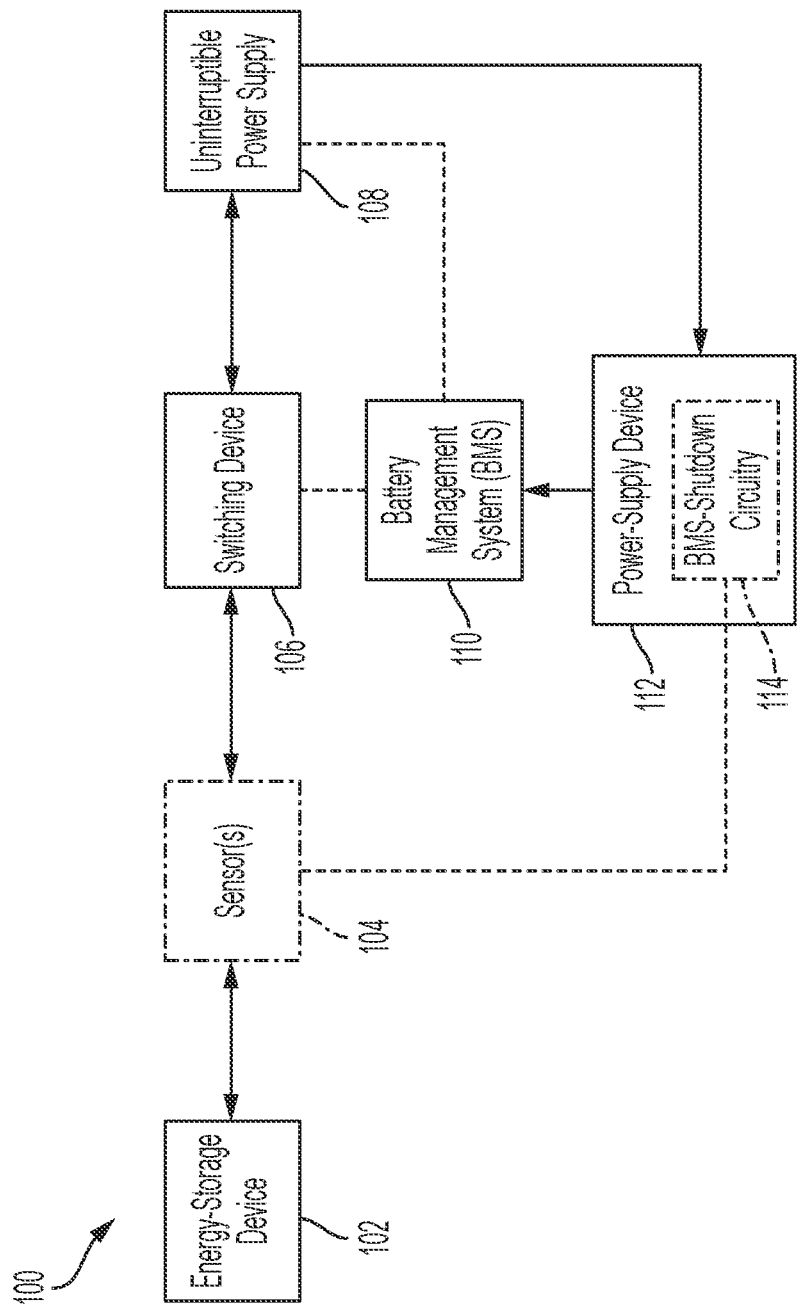
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Uninterruptible power supplies (UPS) may provide uninterrupted power to one or more loads. Example UPSs may be connected to a main power supply, such as a utility grid, and a backup power supply, such as a battery. Such batteries may include lithium-ion batteries. Lithium-ion batteries may have a lifetime over which the batteries can be repeatedly charged and discharged before until an end-of-life is reached. The lifetime of a lithium-ion battery may depend on multiple factors including, for example, ambient operating temperature, frequency of discharge, load power, and so forth.

The lifetime of a lithium-ion battery may also be affected by a depth of discharge of the battery. Depth of discharge may refer to how much energy is discharged from the battery before being recharged. As appreciated by one of skill in the art, significantly discharging the battery (also referred to as a "deep discharge") may reduce a lifetime of the battery considerably more than a "shallow" discharge of the battery. For example, a deep discharge may adversely impact the electrode structure of the battery.

Lithium-ion batteries may include or be coupled to battery-management systems (BMSs) to manage operation of the batteries. For example, a BMS may prevent a battery from being discharged below a certain threshold amount of energy to avoid an excessively deep discharge. The BMS may, for example, open a switching device (for example, a relay) coupled to an output of the battery to prevent further discharge of the battery. The BMS may monitor a depth of discharge of the battery and control the switching device to open when the battery is discharged below a discharge threshold.

Some UPSs drawing power from a battery may also implement functionality to prevent over-discharge of the battery. For example, a UPS may monitor the depth of discharge of the battery and stop drawing power from the battery when the battery is discharged below a discharge threshold. The UPS may implement this functionality in parallel with a BMS preventing over-discharge of the battery, offering advantageous redundancy to preventing over-discharge.

In some examples, the UPS may implement multiple thresholds each corresponding to different modes of operation. For example, at a first threshold, the UPS may stop discharging power to a load, but may still continue to draw a minimal amount of power from the battery to support certain limited operations, such as continuing to output information via a user interface. At a second threshold lower than the first threshold, the UPS may stop drawing power from the battery altogether and shut down. In the event that the UPS continues to draw power below the second threshold (for example, due to a malfunction or error), the BMS may implement a third threshold, which may be equal to or lower than the second threshold, below which the BMS opens the switching device as discussed above.

Accordingly, both the UPS and the BMS may operate to avoid over-discharge of the battery. However, if both the UPS and the BMS fail to disable the battery from discharging power to the UPS below a set threshold, the battery may be over-discharged. For example, if the BMS or UPS experience a software error, the BMS and UPS may be unable to protect the battery from over-discharge.

Examples described herein include a power-supply device configured to provide power to a BMS managing an energy-storage device, such as a lithium-ion battery. The power-supply device may include BMS-control circuitry configured to provide over-discharge protection. The BMS-control circuitry may be implemented in connection with one or more hardware logic components in some examples. In one example, the BMS-control circuitry controls the power-supply device to disable power to the BMS if the battery is discharged below a discharge threshold. Disabling power to the BMS may disable the battery from providing power to the UPS. For example, the BMS may be configured to control a normally open switching device coupled to the output of the battery such that, when the BMS is powered down, the normally open switching device opens.

Accordingly, examples described herein may increase a lifetime of a battery at least in part by reducing a likelihood of over-discharge. It is to be appreciated that the principles of the disclosure are applicable to energy-storage devices other than lithium-ion batteries, including other types of batteries or other types of energy-storage devices, such as capacitors, flywheels, and so forth. Moreover, the principles of the disclosure are not limited to the context of UPSs, which are provided for purposes of example only, and may be applicable to loads other than UPSs drawing power from an energy-storage device. Although in some examples the BMS-control circuitry may be implemented in connection with hardware logic elements, in other examples the BMS-control circuitry may be implemented in connection with software devices, such as one or more controllers executing instructions stored on one or more computer-readable media.

FIG. 1 illustrates a block diagram of a power system 100 according to an example. The power system 100 includes at least one energy-storage device 102 ("energy-storage device 102"), one or more voltage and/or current sensors 104 ("sensors 104"), at least one switching device 106 ("switching device 106"), one or more uninterruptible power supplies 108 ("UPS 108"), a battery-management system 110 ("BMS 110"), and at least one power-supply device 112 ("power-supply device 112"). The power-supply device 112 includes BMS-control circuitry 114.

The energy-storage device 102 is coupled to the sensors 104. The sensors 104 are coupled to the energy-storage device 102 at a first connection, and to the switching device 106 at a second connection. The sensors 104 may also be communicatively coupled to the BMS-control circuitry 114. In some examples, the sensors 104 may be positioned in additional or different locations throughout the power system 100 provided that the sensors 104 are capable of sensing current and/or voltage information of the energy-storage device 102. The switching device 106 is coupled to the sensors 104 at a first connection and to the UPS 108 at a second connection. The switching device 106 may also be communicatively coupled to the BMS 110 at a control connection. The UPS 108 is coupled to the switching device 106 and, in some examples, is coupled to the power-supply device 112 to provide power to the power-supply device 112. The UPS 108 may also be communicatively coupled to the BMS 110. The BMS 110 is coupled to the power-supply device 112. The BMS 110 may also be communicatively coupled to the switching device 106 and the UPS 108. The power-supply device 112 is coupled to the BMS 110 and, in some examples, is coupled to the UPS 108. The BMS-control circuitry is communicatively coupled to the sensors 104.

Figure 2:
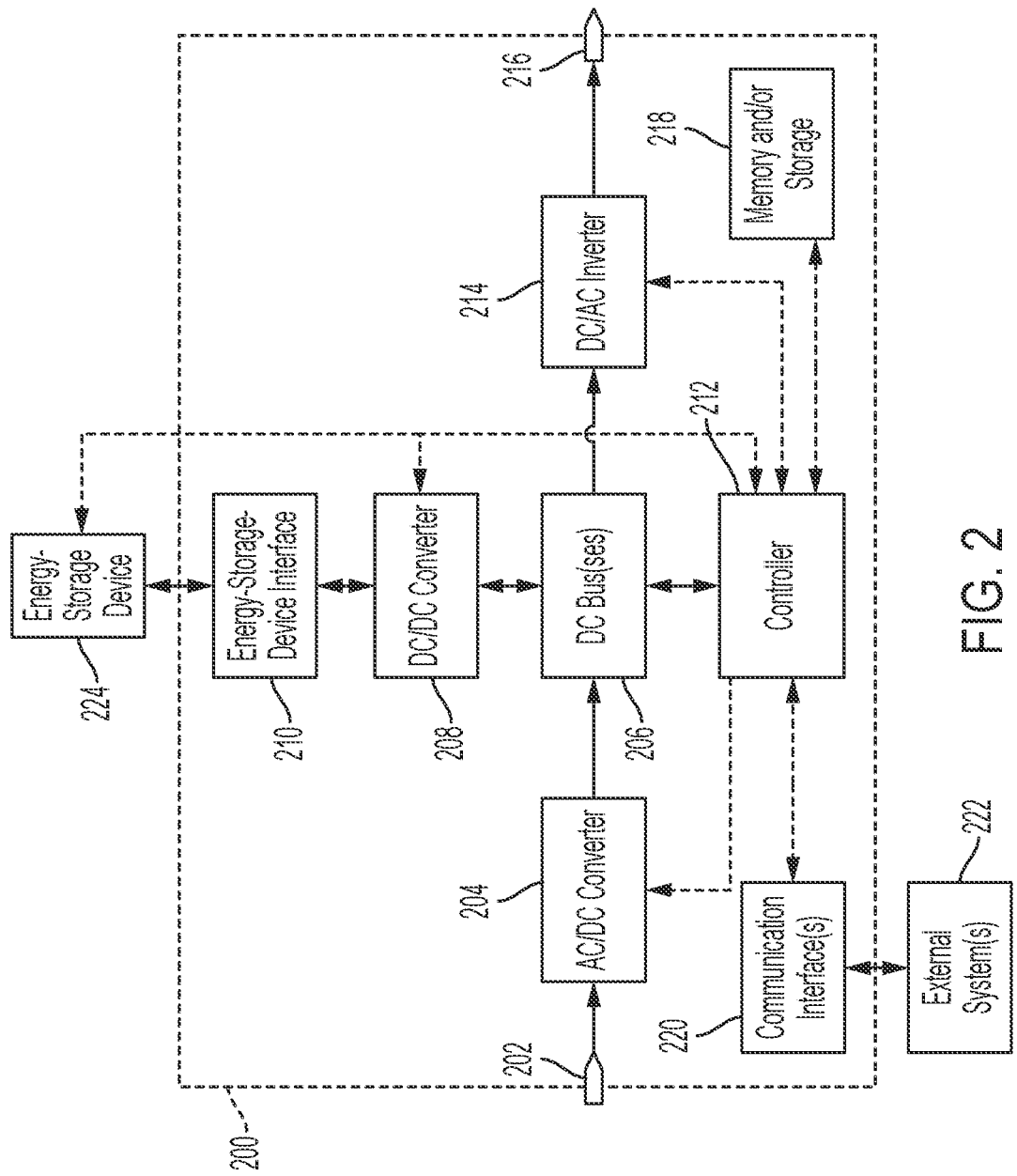
FIG. 2 illustrates a block diagram of an uninterruptible power supply according to an example.

As discussed in greater detail below with respect to FIG. 2, the energy-storage device 102 may be configured to provide power to, and receive power from, the UPS 108. If main power is unavailable to the UPS 108, the UPS 108 may draw stored power from the energy-storage device 102. The energy-storage device 102 may discharge power to the UPS 108 through the sensors 104, which may monitor current and/or voltage information of the discharged power, and through the switching device 106, which the BMS 110 may control to be closed and conducting.

If main power is available to the UPS 108 and the energy-storage device 102 is not fully charged, the UPS 108 may provide power derived from the main power to the energy-storage device 102 to recharge the energy-storage device 102. For example, the UPS 108 may provide power to the energy-storage device 102 through the switching device 106, which the BMS 110 may control to be closed and conducting, and through the sensors 104, which may monitor current and/or voltage information of the discharged power. The energy-storage device 102 may be repeatedly charged and/or discharged in this manner while operating with the UPS 108.

As discussed above, it may be advantageous to avoid over-discharge of the energy-storage device 102. While the energy-storage device 102 discharges power to the UPS 108, the BMS-control circuitry 114 may monitor a discharge level of the energy-storage device 102 based at least in part on current and/or voltage information received from the sensors 104. For example, the BMS-control circuitry 114 may monitor a voltage level of the energy-storage device 102, which may be indicative of the discharge level of the energy-storage device 102.

As discussed in greater detail below with respect to FIG. 3, if a discharge level of the energy-storage device 102 falls below a discharge threshold, the BMS-control circuitry 114 may control the power-supply device 112 to disable power to the BMS 110. Disabling power from the power-supply device 112 to the BMS 110 may cause the BMS 110 to shut down. The switching device 106 may be a normally open switching device such that, when the BMS 110 shuts down and therefore stops providing control signals to the switching device 106, the switching device 106 opens. Opening the switching device 106 interrupts a discharge path from the energy-storage device 102 to the UPS 108. Accordingly, the BMS-control circuitry 114 may prevent over-discharge of the energy-storage device 102 below a discharge threshold by selectively controlling power to the BMS 110.

An example of the UPS 108 is provided for purposes of explanation. FIG. 2 illustrates a block diagram of a UPS 200 according to an example. The UPS 200 may be an example of the UPS 108. The UPS 200 includes an input 202, an AC/DC converter 204, one or more DC busses 206, a DC/DC converter 208, an energy-storage-device interface 210, at least one controller 212 ("controller 212"), a DC/AC inverter 214, an output 216, a memory and/or storage 218, and one or more communication interfaces 220 ("communication interfaces 220"), which may be communicatively coupled to one or more external systems 222 ("external systems 222"). For example, the external systems 222 may include the BMS 110, the BMS-control circuitry 114, and/or other components of the power system 100.

The input 202 is coupled to the AC/DC converter 204 and to an AC power source (not pictured), such as an AC mains power supply. The AC/DC converter 204 is coupled to the input 202 and to the one or more DC busses 206, and is communicatively coupled to the controller 212. The one or more DC busses 206 are coupled to the AC/DC converter 204, the DC/DC converter 208, and to the DC/AC inverter 214, and are communicatively coupled to the controller 212. The DC/DC converter 208 is coupled to the one or more DC busses 206 and to the energy-storage-device interface 210, and is communicatively coupled to the controller 212.

The energy-storage-device interface 210 is coupled to the DC/DC converter 208, and is configured to be coupled to at least one energy-storage device 224 and/or another energy-storage device. In some examples, the UPS 200 may include one or more energy-storage devices, which may include the energy-storage device 224. In various examples, the energy-storage device 224 may include one or more batteries, capacitors, flywheels, or other energy-storage devices. The energy-storage device 224 may include or be an example of the energy-storage device 102. For example, the energy-storage-device interface 210 may be coupled to the energy-storage device 102 via the sensors 104 and the switching device 106.

The DC/AC inverter 214 is coupled to the one or more DC busses 206 and to the output 216, and is communicatively coupled to the controller 212. The output 216 is coupled to the DC/AC inverter 214, and to an external load (not pictured). In some examples, the output 216 may be coupled to the power-supply device 112. For example, the UPS 108 may provide output power derived from the input 202 and/or the energy-storage-device interface 210 to the power-supply device 112 via the output 216. The controller 212 is communicatively coupled to the AC/DC converter 204, the one or more DC busses 206, the DC/DC converter 208, the energy-storage-device interface 210, the DC/AC inverter 214, the memory and/or storage 218, and the communication interfaces 220.

The input 202 is configured to be coupled to an AC mains power source and to receive input AC power having an input voltage level. The UPS 200 is configured to operate in different modes of operation based on the input voltage of the AC power provided to the input 202. The controller 212 may determine a mode of operation in which to operate the UPS 200 based on whether the input voltage of the AC power is acceptable. The controller 212 may include or be coupled to one or more sensors configured to sense parameters of the input voltage. For example, the controller 212 may include or be coupled to one or more sensors configured to sense a voltage level of the AC power received at the input 202.

When AC power provided to the input 202 is acceptable (for example, by having parameters, such as an input voltage value, that meet specified values, such as by falling within a range of acceptable input voltage values), the controller 212 controls components of the UPS 200 to operate in a normal mode of operation. In the normal mode of operation, AC power received at the input 202 is provided to the AC/DC converter 204. The AC/DC converter 204 converts the AC power into DC power and provides the DC power to the one or more DC busses 206. The one or more DC busses 206 distribute the DC power to the DC/DC converter 208 and to the DC/AC inverter 214. The DC/DC converter 208 converts the received DC power and provides the converted DC power to the energy-storage-device interface 210. The energy-storage-device interface 210 receives the converted DC power, and provides the converted DC power to the energy-storage device 224 to charge the energy-storage device 224 as desired (for example, if the energy-storage device 224 is not fully charged). The DC/AC inverter 214 receives DC power from the one or more DC busses 206, converts the DC power into regulated AC power, and provides the regulated AC power to the output 216 to be delivered to a load.

When AC power provided to the input 202 from the AC mains power source is not acceptable (for example, by having parameters, such as an input voltage value, that do not meet specified values, such as by falling outside of a range of acceptable input voltage values), the controller 212 controls components of the UPS 200 to operate in a backup mode of operation. In the backup mode of operation, DC power is drawn from the energy-storage device 224 to the energy-storage-device interface 210, and the energy-storage-device interface 210 provides the discharged DC power to the DC/DC converter 208. The DC/DC converter 208 converts the received DC power and distributes the DC power amongst the one or more DC busses 206. For example, the DC/DC converter 208 may evenly distribute the power amongst the one or more DC busses 206. The one or more DC busses 206 provide the received power to the DC/AC inverter 214. The DC/AC inverter 214 receives the DC power from the one or more DC busses 206, converts the DC power into regulated AC power, and provides the regulated AC power to the output 216.

The controller 212 may store information in, and/or retrieve information from, the memory and/or storage 218. For example, the controller 212 may store information indicative of sensed parameters (for example, input-voltage values of the AC power received at the input 202) in the memory and/or storage 218. The controller 212 may further receive information from, or provide information to, the communication interfaces 220. The communication interfaces 220 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 222, or other entities, such as human beings. The external systems 222 may include any device, component, module, and so forth, that is external to the UPS 200, such as a server, database, laptop computer, desktop computer, tablet computer, smartphone, central controller or data-aggregation system, other UPSs, and so forth.

The controller 212 may further be configured to control operation of the UPS 200. For example, the controller 212 may control the UPS 200 to draw power from the energy-storage device 224, which may be an example of the energy-storage device 102, when main power is not acceptable. As discussed above, the UPS 108 may be configured to discontinue drawing power from the energy-storage device 102 when the energy-storage device 102 is below a discharge threshold to avoid over-discharge of the energy-storage device 102. For example, the controller 212 may control the UPS 108 to stop drawing power to avoid over-discharge of the energy-storage device 102. However, in other examples, the controller 212 may not be configured to avoid over-discharge of the energy-storage device 102, or the controller 212 may experience a malfunction that prevents the controller 212 from properly monitoring and avoiding over-discharge of the energy-storage device 102. Accordingly, as discussed above, the BMS-control circuitry 114 may be configured to disable power to the BMS 110 and thereby prevent the energy-storage device 102 from discharging power to the UPS 108.

Figure 3:
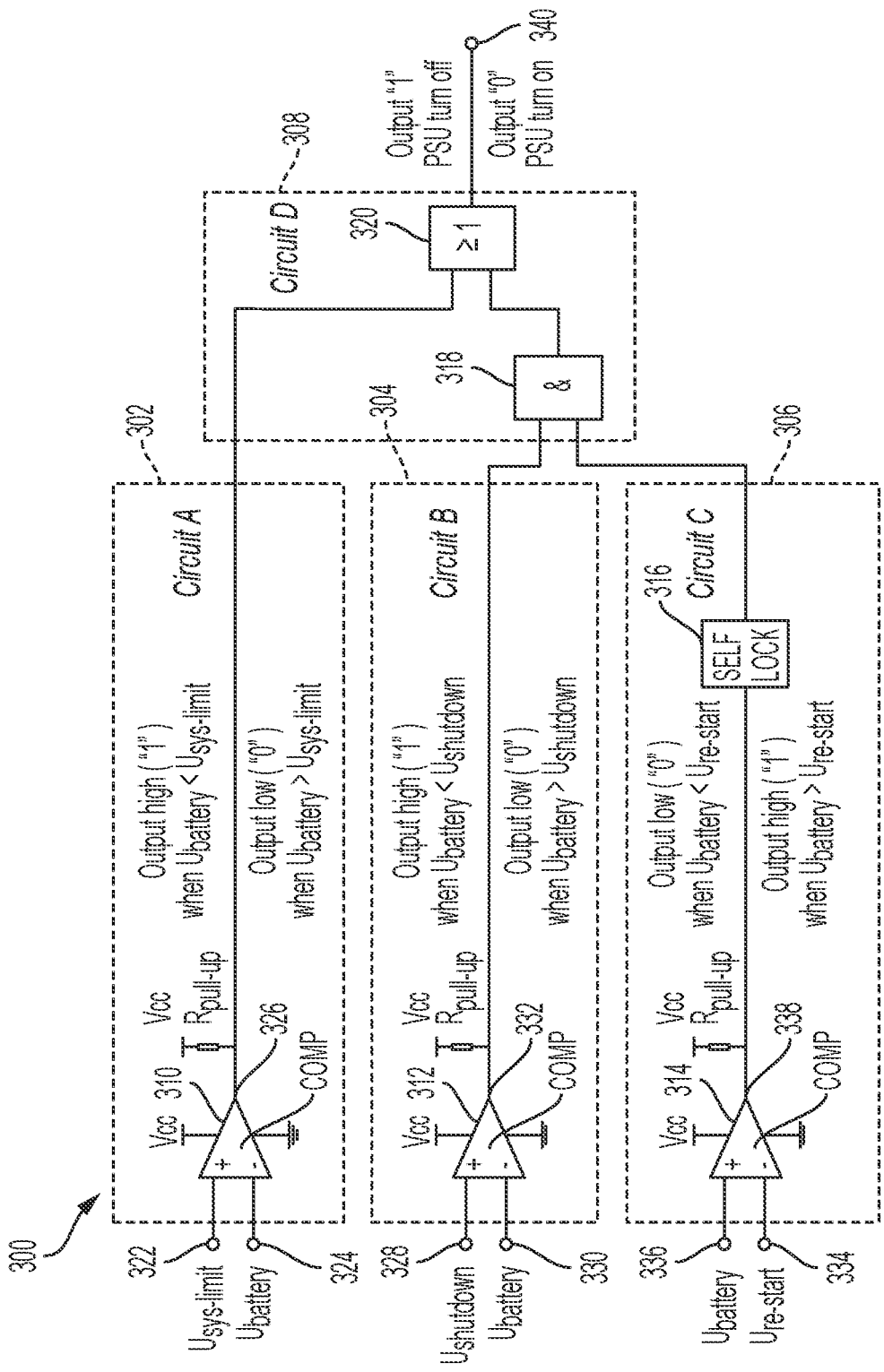
FIG. 3 illustrates a schematic diagram of battery-management-system-control circuitry according to an example.

FIG. 3 illustrates a schematic diagram of BMS-control circuitry 300 according to an example. The BMS-control circuitry 300 may be an example of at least a portion of the BMS-control circuitry 114. The BMS-control circuitry 300 may be configured to output a control signal to control a state of the power-supply device 112. For example, the BMS-control circuitry 300 may be configured to output a control signal having a first state (for example, a logical LOW signal) to maintain the power-supply device 112 in a powered-on operational state, and a second state (for example, a logical HIGH signal) to power down the power-supply device 112.

The BMS-control circuitry 114 includes a first circuit 302, a second circuit 304, a third circuit 306, and a fourth circuit 308. The first circuit 302 includes a first comparator 310. The second circuit 304 includes a second comparator 312. The third circuit 306 includes a third comparator 314 and a latch circuit 316. The fourth circuit 308 includes an AND gate 318 and an OR gate 320.

The first comparator 310 includes a first input 322 configured to receive a first voltage signal Usys-limit indicative of a first discharge threshold, a second input 324 configured to receive a battery-voltage signal Ubattery indicative of a voltage level of an energy-storage device, such as the energy-storage device 102, and an output 326 configured to be coupled to, and provide a first output signal to, the OR gate 320. In some examples, the first input 322 is a noninverting input and the second input 324 is an inverting input. The BMS-control circuitry 300 may include or be coupled to at least one voltage-supply device configured to store information indicative of a value of Usys-limit and provide the Usys-limit signal to the first comparator 310.

The second comparator 312 includes a first input 328 configured to receive a second voltage signal Ushutdown indicative of a second discharge threshold, a second input 330 configured to receive the battery-voltage signal Ubattery, and an output 332 configured to be coupled to, and provide a second output signal to, the AND gate 318. In some examples, the first input 328 is a noninverting input and the second input 330 is an inverting input. The BMS-control circuitry 300 may include or be coupled to at least one voltage-supply device configured to store information indicative of a value of Ushutdown and provide the Ushutdown signal to the second comparator 312.

The third comparator 314 includes a first input 334 configured to receive a third voltage signal Ure-start indicative of a third discharge threshold, a second input 336 configured to receive the battery-voltage signal Ubattery, and an output 338 configured to be coupled to, and provide a third output signal to, the latch circuit 316. In some examples, the first input 334 is an inverting input and the second input 336 is a noninverting input. The BMS-control circuitry 300 may include or be coupled to at least one voltage-supply device configured to store information indicative of a value of Ure-start and provide the Ure-start signal to the third comparator 314.

The latch circuit 316 is coupled to the output 338 at an input connection, and is coupled to the AND gate 318 at an output connection. The AND gate 318 is coupled to the output 332 at a first input connection, to the output connection of the latch circuit 316 at a second input connection, and to the OR gate 320 at an output connection. The OR gate 320 is coupled to the output 326 at a first input connection, the output connection of the AND gate 318 at a second input connection, and an output terminal 340 at an output connection.

The output terminal 340 may be coupled to one or more power-control elements of the power-supply device 112, such as a switching device configured to control power output by the power-supply device 112 to the BMS 110. If a signal at the output terminal 340 is "1," that is, at a logical HIGH value, then the power-supply device 112 may be disabled and thereby stop providing power to the BMS 110. The BMS 110, in turn, may open the switching device 106 upon being powered down. If a signal at the output terminal 340 is "0," that is, a logical LOW value, then the power-supply device 112 may be enabled and thereby provide power to the BMS 110. The BMS 110, in turn, is operational and may open or close the switching device 106.

As appreciated by one of ordinary skill in the art, the output of the OR gate 320 may be HIGH if an output of the first circuit 302 is HIGH, or if an output of both the second circuit 304 and the third circuit 306 are HIGH. Accordingly, the circuits 302-306 are configured to control the signal at the output terminal 340 and thereby control the state of the power-supply device 112. As discussed in greater detail below with respect to FIG. 4, an output of each of the circuits 302-306 may depend on a comparison of the voltage level of the energy-storage device 102, indicated by the battery-voltage signal Ubattery, to respective voltage thresholds indicated by the voltage signals Usys-limit, Ushutdown, and Ure-start.

In one example, Ure-start may be higher than Ushutdown, and Ushutdown may be higher than Usys-limit. That is, in one example, Usys-limit<Ushutdown<Ure-start. Ushutdown may represent a voltage level below which the energy-storage device 102 should normally be shut down, unless recharging power is available to recharge the energy-storage device 102.

Accordingly, the second comparator 312 compares the battery voltage indicated by Ubattery to the second discharge threshold indicated by Ushutdown and, if the battery voltage drops below the second discharge threshold, the second comparator 312 outputs a logical HIGH signal to the AND gate 318.

The AND gate 318 is configured to output a logical HIGH signal to the OR gate 320, and thereby power down the power-supply device 112, if both the second comparator 312 and the latch circuit 316 output a logical HIGH signal to the AND gate 318. The third comparator 314 and the latch circuit 316 operate to provide specialized re-start functionality such that the energy-storage device 102 is capable of being recharged from voltage levels below Ushutdown but prevented from being discharged further after the voltage level Ubattery of the energy-storage device 102 falls below Ushutdown.

An example is provided to explain operation of the third comparator 314 and the latch circuit 316. When the energy-storage device 102 discharges sufficiently that the battery voltage indicated by Ubattery falls below the second threshold indicated by Ushutdown, it may be advantageous to stop discharging power to the UPS 108 by opening the switching device 106. If the UPS 108 regains access to main power and is capable of recharging the energy-storage device, it may be advantageous to re-couple the energy-storage device 102 to the UPS 108 by closing the switching device 106 to again charge the energy-storage device 102. However, the battery voltage Ubattery may still be less than the second threshold Ushutdown when the UPS 108 is capable of recharging the energy-storage device 102. It may therefore be desirable to implement more complex logic than simply opening the switching device 106 when the battery voltage Ubattery is less than the second threshold indicated by Ushutdown to ensure that the energy-storage device 102 can be recharged when recharging power is available.

The third comparator 314 and the latch circuit 316 enable the BMS-control circuitry 300 to distinguish between these two scenarios in which Ubattery is less than Ushutdown. Ure-start may represent a voltage level to which the energy-storage device 102 is configured to be recharged upon being restarted before being able to again discharge power to the UPS 108. If the battery voltage indicated by Ubattery is greater than Ure-start (for example, while the energy-storage device 102 is discharging and still has a relatively high amount of remaining power), then the third comparator 314 may output a HIGH signal to the latch circuit 316. The latch circuit 316 may output a HIGH output signal to the AND gate 318. The latch circuit 316 may latch the output signal at a HIGH value such that, even if the third comparator 314 subsequently outputs a LOW output signal to the latch circuit 316, the latch circuit 316 continues to output a HIGH signal. In various examples, the latch circuit 316 will continue to output a HIGH signal until the BMS-control circuitry 300 is shut off.

As the energy-storage device 102 continues to discharge, the battery voltage Ubattery may drop below Ure-start. Although the third comparator 314 may transition from outputting a logical HIGH signal to a logical LOW signal, the latch circuit 316 continues to provide a logical HIGH signal to the AND gate 318.

If the energy-storage device 102 continues discharging, the voltage level indicated by Ubattery may eventually drop below the second threshold indicated by Ushutdown, which may be less than the third threshold indicated by Ure-start. As discussed above, the second comparator 312 may output a logical HIGH signal responsive to the voltage level indicated by Ubattery dropping below the second threshold indicated by Ushutdown. Accordingly, both the second comparator 312 and the latch circuit 316 output a logical HIGH signal to the AND gate 318. The AND gate 318 responsively outputs a logical HIGH signal to the OR gate 320. The OR gate 320 may output a logical HIGH signal regardless of the signal output by the first comparator 310. The OR gate 320 outputting the logical HIGH signal may cause the power-supply device 112 to disable power to the BMS 110, thereby opening the switching device 106 and discontinuing discharge of the energy-storage device 102.

Accordingly, although the third comparator 314 may be outputting a logical LOW value in this scenario, the latch circuit 316 provides a latched HIGH signal to the AND gate 318. The latched HIGH signal ensures that, when the battery voltage Ubattery drops from above Ure-start to below Ushutdown, the BMS-control circuitry 300 is shut down. Conversely, the BMS-control circuitry 300 may not be shut down where the BMS-control circuitry 300 is powered up and Ubattery is initially less than Ushutdown and Ure-start. For example, if the power system 100 is subsequently re-started (for example, responsive to a user interacting with a system-restart element, such as a button, on a user interface of one or more devices of the power system 100) when main power is available to the UPS 108, the voltage level indicated by Ubattery may still be below the second threshold indicated by Ushutdown. Accordingly, the second comparator 312 may continue to output a logical HIGH signal to the AND gate 318. The third comparator 314 may output a logical LOW signal, because Ubattery may be below Ure-start.

However, because the latch circuit 316 has been restarted, the latch circuit 316 may not output a latched HIGH signal until is received. Because Ubattery may be less than Ure-start upon being restarted, the third comparator 314 outputs a logical LOW value to the latch circuit 316. Accordingly, the latch circuit 316 outputs a logical LOW value to the AND gate 318. The AND gate 318 thus outputs a logical LOW value to the OR gate 320, preventing the BMS-control circuitry 300 from being powered down.

The latch circuit 316 thus supports a specialized re-start period during which the power system 100 is not shut down even when Ubattery is below Ushutdown, provided that the latch circuit 316 has not received a logical HIGH value since being powered up. The latch circuit 316, in combination with the third comparator 314, may thus be able to distinguish between two operations.

In a first operation, the energy-storage device 102 is initially discharged below Ure-start and Ushutdown. It may be desirable to disable the power-supply device 112 once Ubattery drops below Ushutdown. In a second operation, the energy-storage device 102 is being recharged after re-starting the power system 100, and it may be desirable to enable the power-supply device 112 such that the energy-storage device 102 can be recharged even if Ubattery is below Ushudown. Once Ubattery again exceeds Ure-start, the latch circuit 316 may again latch an output signal at a logical HIGH level, thereby priming the BMS-control circuitry to be once again shut down if Ubattery drops below Ushutdown.

In some examples, however, Ubattery may drop below Ushutdown by a significant enough amount that, even if recharging power is available from the UPS 108, it may not be desirable to recharge the energy-storage device 102 via the UPS 108. For example, it may be preferable for a service professional to remove the energy-storage device 102 and either manually recharge the energy-storage device 102 or dispose of the energy-storage device 102 below such a level. This level may be represented by Usys-limit, representing a system limit below which the energy-storage device 102 should be managed by a professional.

The first comparator 310 may implement this functionality by outputting a logical HIGH signal to the OR gate 320 if Ubattery drops below Usys-limit. The OR gate 320 may output a signal having a logical HIGH value responsive to receiving the logical HIGH signal from the first comparator 310 regardless of the values output by the AND gate 318 and, by extension, the comparators 312, 314. As discussed above, the power-supply device 112 may be disabled responsive to the OR gate 320 outputting the logical HIGH signal.

Figure 4:
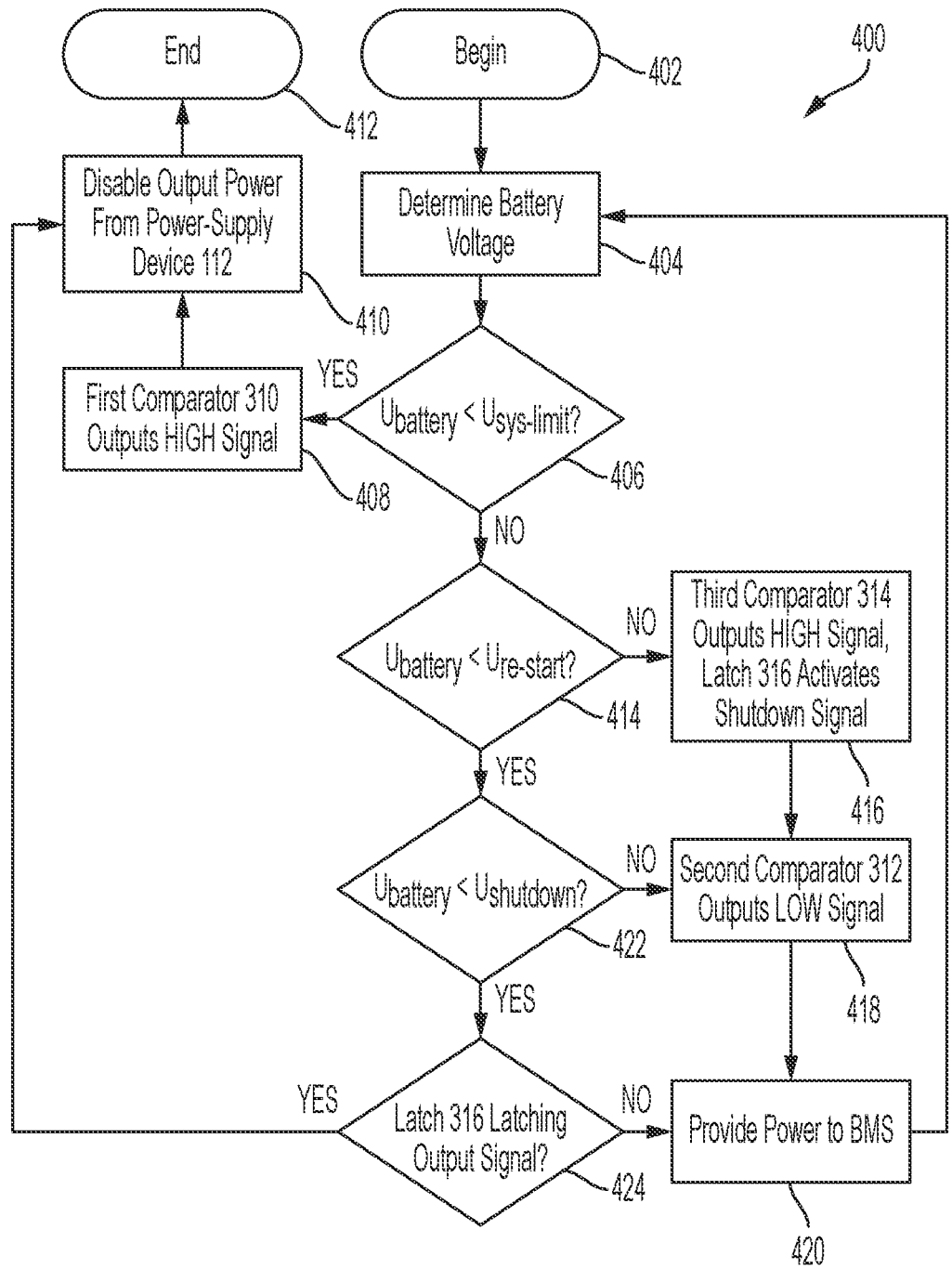
FIG. 4 illustrates a process of operating battery-management-system-control circuitry according to an example.

FIG. 4 illustrates a process 400 of operating the BMS-control circuitry 114 according to an example. As discussed above, the BMS-control circuitry 300 may provide one example of the BMS-control circuitry 114. Examples of the process 400 are provided with respect to the BMS-control circuitry 300 for purposes of explanation, but it is to be appreciated that the process 400 may be applicable to other implementations of the BMS-control circuitry 114. For example, as discussed above, the BMS-control circuitry 114 may include one or more other software, firmware, and/or hardware elements, such as at least one controller coupled to one or more computer-readable media configured to store instructions which, when executed by the at least one controller, execute the process 400. Furthermore, although aspects of the process 400 are illustrated in an example order for purposes of explanation, it is to be appreciated that acts of the process 400 may be executed in a different order in other examples, and/or in parallel with other acts of the process 400.

At act 402, the process 400 begins.

At act 404, the BMS-control circuitry 300 determines a voltage level of the energy-storage device 102. For example, the BMS-control circuitry 300 may be communicatively coupled to the sensors 104, which may sense voltage level of the energy-storage device 102. The sensors 104 may send the voltage signal Ubattery, which is indicative of a voltage level of the energy-storage device 102, to the BMS-control circuitry 300. As discussed above, the voltage signal Ubattery may be provided to a respective input of each of the comparators 312, 314, 316.

At act 406, the BMS-control circuitry 300 determines whether the voltage level indicated by Ubattery is less than Usys-limit. As discussed above, Usys-limit may be a lowest voltage threshold and may indicate a point at which the energy-storage device 102 is discharged deeply enough that a service professional may be contacted to handle the energy-storage device 102. Act 406 may include the first comparator 310 comparing Ubattery to Usys-limit. If Ubattery is less than Usys-limit (406 YES), then the first comparator 310 may output a logical HIGH signal to the OR gate 320. The process 400 then continues to act 408.

At act 408, the first comparator 310 outputs a logical HIGH signal to the OR gate 320. The OR gate 320 outputs a logical HIGH signal responsive to receiving the logical HIGH value from the first comparator 310 regardless of a signal received from the AND gate 318. The process 400 continues to act 410.

At act 410, the power-supply device 112 disables output power output to the BMS 110. As discussed above, the logical HIGH signal output by the OR gate 320 may control the power-supply device 112 to disable power to the BMS 110. Without power from the power-supply device 112, the BMS 110 may be disabled and powered down. At least because the BMS 110 is disabled, the BMS 110 may not control the switching device 106 to be closed. Accordingly, the switching device 106 may open, thereby disconnecting the energy-storage device 102 from the UPS 108. Disconnecting the energy-storage device 102 from the UPS 108 may cause the UPS 108 to power down. In examples in which the power-supply device 112 receives power from the UPS 108, disconnecting the energy-storage device 102 from the UPS 108 may also cause the power-supply device 112 to power down. The process 400 then ends at act 412.

Figure 5:
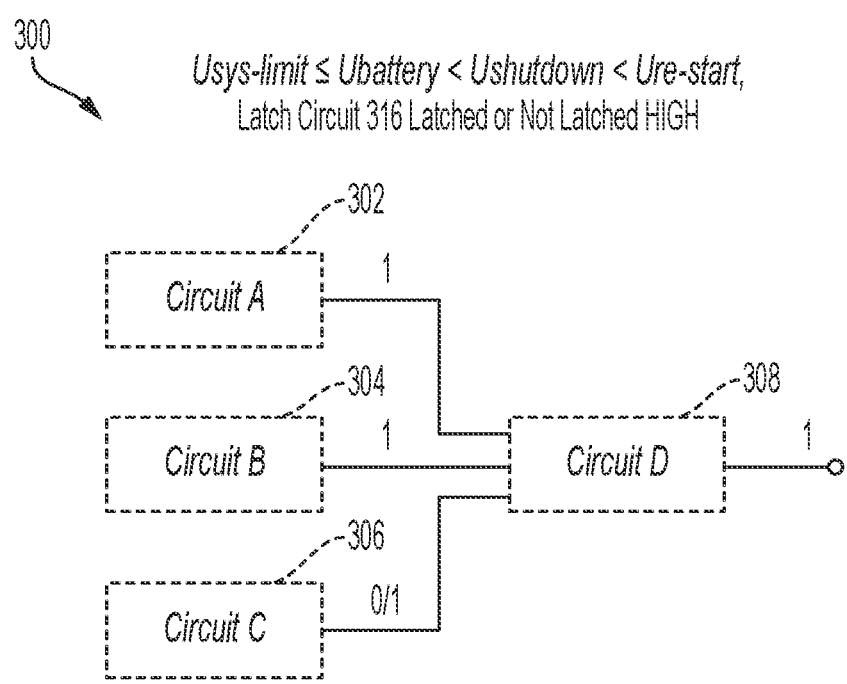
FIG. 5 illustrates a simplified block diagram of battery-management-system-control circuitry according to an example.

FIG. 5 illustrates a simplified block diagram of the BMS-control circuitry 300 in accordance with the foregoing example in which Ubattery is less than Usys-limit (406 NO). In some examples, Usys-limit is less than Ure-start and Ushutdown. Because Ubattery is determined to be less than Usys-limit (406 YES), Ubattery is also less than Ure-start and Ushutdown in this example. The first circuit 302 outputs a logical HIGH signal responsive to Ubattery being less than Usys-limit. The second circuit 304 outputs a logical HIGH signal responsive to Ubattery being less than Ushutdown. The third circuit 306 may output either a logical LOW value or a logical HIGH value depending on whether the latch circuit 316 outputs a latched HIGH signal. However, the fourth circuit 308 outputs a logical HIGH signal responsive to receiving the logical HIGH signal from the first circuit 302 regardless of whether or not the latch circuit 316 outputs a latched HIGH signal because the OR gate 320 of the fourth circuit 308 is coupled to the first circuit 302. FIG. 5 may represent the BMS-control circuitry 300 in a deep-discharge mode of operation in which the energy-storage device 102 should be handled by a service professional.

Returning to act 406, if Ubattery is greater than or equal to Usys-limit (406 NO), then the first comparator 310 outputs a logical LOW signal and the process 400 continues to act 414. At act 414, the BMS-control circuitry 300 determines whether Ubattery is less than Ure-start. For example, the third comparator 314 may determine whether Ubattery is less than Ure-start. If Ubattery is equal to or greater than Ure-start (414 NO), then the third comparator 314 may output a logical HIGH signal to the latch circuit 316. The process 400 continues to act 416.

At act 416, the third comparator 314 outputs a logical HIGH signal to the latch circuit 316, which activates a shutdown signal. Activating the shutdown signal may include the latch circuit 316 outputting a latched HIGH signal. As discussed above, if the latch circuit 316 receives a logical HIGH signal from the third comparator 314, the latch circuit 316 may continue to output a logical HIGH signal until and unless the BMS-control circuitry 300 is powered down, even if the third comparator 314 subsequently stops outputting a logical HIGH signal. The latch circuit 316 outputting the logical HIGH signal may prepare the BMS-control circuitry 300 to shut down if Ubattery subsequently decreases below Ushutdown. If the latch circuit 316 is subsequently restarted responsive to the BMS-control circuitry 300 receiving a start-up signal, the latch circuit 316 will maintain the shutdown signal deactivated (that is, will output a logical LOW signal and will not output a latched HIGH signal) until the latch circuit 316 again receives a logical HIGH signal from the third comparator 314. The process 400 continues to act 418.

At act 418, the second comparator 312 outputs a logical LOW value to the AND gate 318. As discussed above, Ushutdown may be lower than Ure-start. Thus, if the third comparator 314 determines that Ubattery is greater than or equal to Ure-start (414 NO), the second comparator 312 may determine that Ubattery is greater than Ushutdown. The second comparator 312 may therefore output a logical LOW signal to the AND gate 318 at least when the third comparator 314 is outputting a logical HIGH signal. Although the latch circuit 316 provides a logical HIGH signal to the AND gate 318, the AND gate 318 may output a logical LOW signal to the OR gate 320 responsive to receiving the logical LOW signal from the second comparator 312. The OR gate 320 may output a logical LOW signal responsive to receiving the logical LOW signal from the AND gate 318 and the logical LOW signal from the first comparator 310, as discussed above at act 406. The process 400 continues to act 420.

At act 420, the power-supply device 112 provides power to the BMS 110. The BMS 110, in turn, may control the switching device 106 to couple the energy-storage device 112 to the UPS 108. As discussed above, an output of the OR gate 320 may control whether the power-supply device 112 provides power to the BMS 110. In one example, a logical LOW output of the OR gate 320 may correspond to the power-supply device 112 providing power to the BMS 110. Accordingly, act 420 may include the power-supply device 112 providing power to the BMS 110 based on the OR gate 320 outputting a logical LOW signal.

Figure 6:
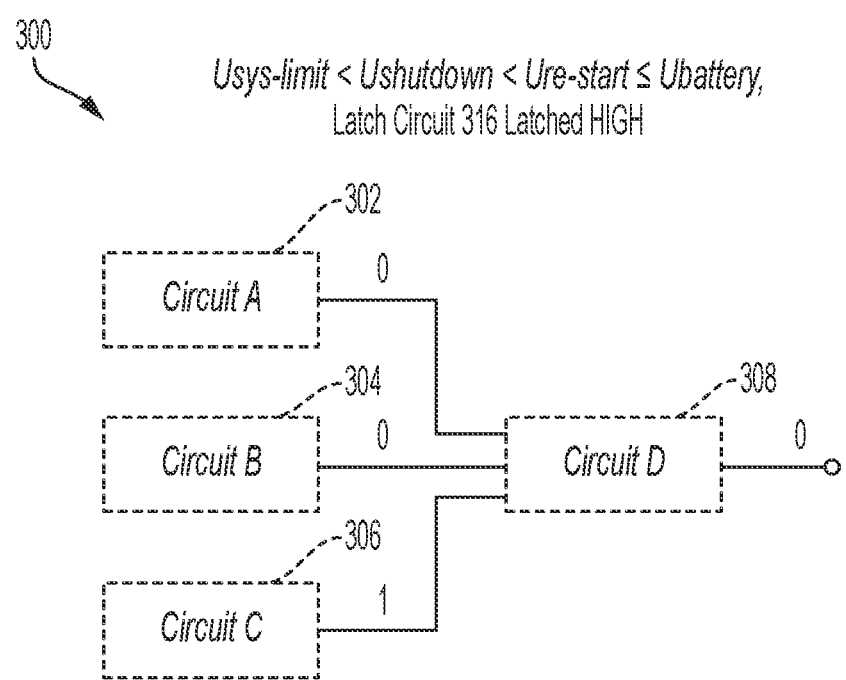
FIG. 6 illustrates a simplified block diagram of battery-management-system-control circuitry according to another example.

FIG. 6 illustrates a simplified block diagram of the BMS-control circuitry 300 in accordance with the foregoing example in which Ubattery is greater than or equal to Usys-limit (406 NO), Ure-start (414 NO), and Ushutdown (418). The first circuit 302 and the second circuit 304 each output a logical LOW value, and the third circuit 306 outputs a logical HIGH value. The fourth circuit 408, in turn, outputs a logical LOW value such that the power-supply device 112 provides power to the BMS 110. The BMS 110 may therefore control the switching device 106 to couple the energy-storage device 102 to the UPS 108. FIG. 6 may represent the BMS-control circuitry 300 in a normal mode of operation in which the energy-storage device 102 is prepared to discharge, or in a battery mode of operation in which the energy-storage device 102 is in the process of discharging.

The process 400 may then return to act 404, and the process 400 may be repeated as a new signal Ubattery indicative of the voltage level of the energy-storage device 102 is received. It is to be appreciated that although an example of the process 400 is provided with certain acts, in some examples components of the BMS-control circuitry 300 may operate substantially continuously and in parallel. For example, each of the comparators 310-314 may continuously execute the comparisons discussed above in parallel. The process 400 is described with respect to certain acts, and in a particular order, for purposes of explanation only.

Returning to act 414, if the third comparator 314 determines that Ubattery is less than Ure-start (414 YES), then the third comparator 314 may output a logical LOW value to the latch circuit 316. As discussed above, if the latch circuit 316 is already outputting a latched HIGH signal, the latch circuit 316 will continue to output the latched HIGH circuit despite the third comparator 314 outputting the logical LOW value to the latch circuit 316. Accordingly, the AND gate 318 continues to receive the logical HIGH value despite the change in output from the third comparator 314. The process 400 continues to act 422.

At act 422, the second comparator 312 determines whether Ubattery is less than Ushutdown. If Ubattery is greater than or equal to Ushutdown (422 NO), then the process 400 continues to act 418. As discussed above, at act 418 the second comparator 312 may output a logical LOW value to the AND gate 318. The AND gate 318 may therefore output a logical LOW signal to the OR gate 320 regardless of a signal received by the AND gate 318 from the latch circuit 316.

Figure 7:
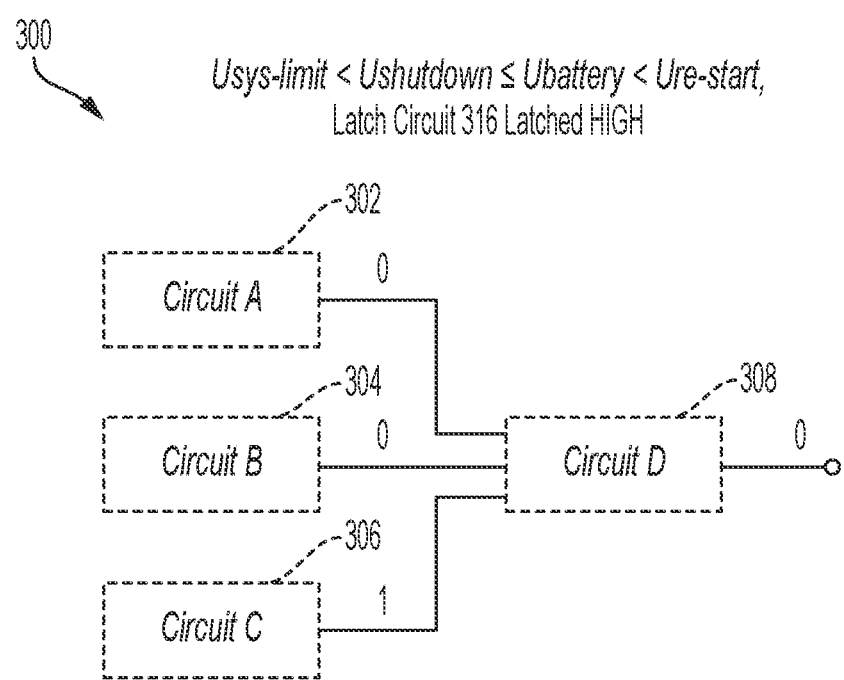
FIG. 7 illustrates a simplified block diagram of battery-management-system-control circuitry according to another example.

FIG. 7 illustrates a simplified block diagram of the BMS-control circuitry 300 in an example in which Ubattery is greater than Usys-limit and Ushutdown but less than Ure-start, and in which an output of the latch circuit 316 is at a logical HIGH value. For example, the latch circuit 316 may output a logical HIGH value despite Ubattery being less than Ure-start where the latch circuit 316 previously received a logical HIGH value from the third comparator 314 and has not since been restarted. Restarting the latch circuit 316 may cause the latch circuit 316 to output a logical LOW signal until a logical HIGH signal is again received from the third comparator 314 when Ubattery exceeds Ure-start. In the example illustrated by FIG. 7, therefore, the first circuit 302 and the second circuit 304 output a logical LOW value, and the third circuit 306 outputs a logical HIGH value. The fourth circuit 308 responsively outputs a logical LOW signal to maintain the power-supply device 112 enabled. FIG. 7 may continue to represent the state of the BMS-control circuitry 300 until Ubattery drops below Ushutdown (by discharging the energy-storage device 102) or increases above Ure-start (by recharging the energy-storage device 102), or until the BMS-control circuitry 300 is restarted as illustrated with respect to FIG. 8. FIG. 7 may represent the BMS-control circuitry 300 in the battery mode of operation in which the energy-storage device 102 is discharging, or in the normal mode of operation in which the energy-storage device 102 is recharging.

Figure 8:
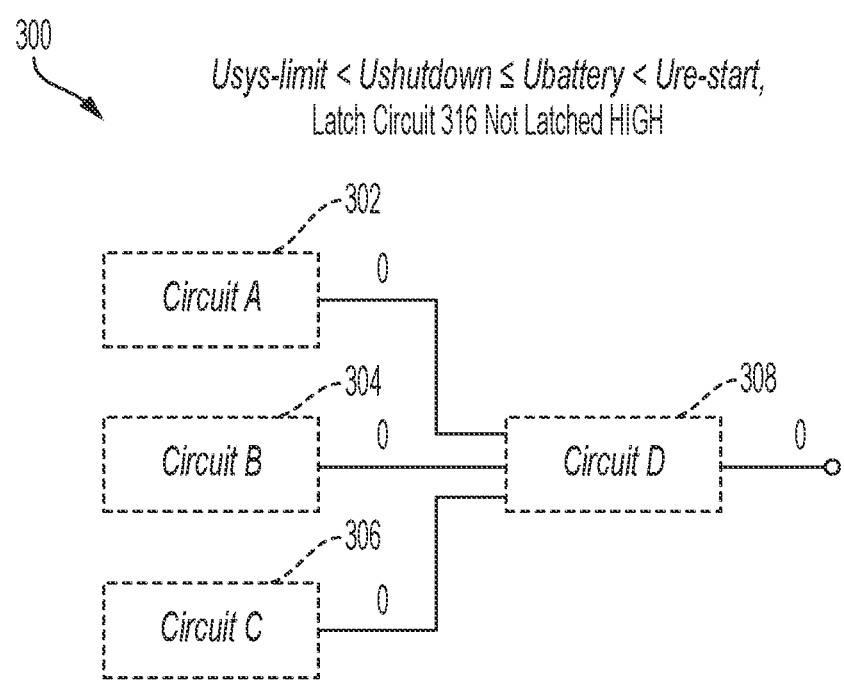
FIG. 8 illustrates a simplified block diagram of battery-management-system-control circuitry according to another example.

FIG. 8 illustrates a simplified block diagram of the BMS-control circuitry 300 in an example in which Ubattery is greater than Usys-limit and Ushutdown but less than Ure-start, and in which an output of the latch circuit 316 is at a logical LOW value. FIG. 8 may illustrate the BMS-control circuitry 300 where, for example, the BMS-control circuitry 300 is in the state illustrated by FIG. 7 and is then restarted, thereby causing the latch circuit 316 to output a logical LOW value. Because Ubattery is less than Ure-start, the third comparator 314 outputs a logical LOW value to the latch circuit 316. Because the latch circuit 316 has not received a logical HIGH value since being powered up in this example, the latch circuit 316 may output a logical LOW value responsive to receiving the logical LOW value from the third comparator 314. In the example illustrated by FIG. 8, therefore, each of the circuits 302-306 outputs a logical LOW value. The fourth circuit 308 responsively outputs a logical LOW signal to maintain the power-supply device 112 enabled. FIG. 8 may continue to represent the state of the BMS-control circuitry 300 until Ubattery drops below Ushutdown, as discussed with respect to 422 YES, or increases above Ure-start. FIG. 8 may represent the BMS-control circuitry 300 in a forced-restart mode of operation in which the BMS-control circuitry 300 is restarted (for example, responsive to a user input when recharging power is available to the UPS 108) after having been discharged below Ure-start.

Returning to act 422, if the second comparator 312 determines that Ubattery is less than Ushutdown (422 YES), then the second comparator 312 outputs a logical HIGH value to the AND gate 318. The process 400 continues to act 424.

At act 424, the AND gate 318 determines whether the latch circuit 316 is providing a latched HIGH signal. As discussed above, if Ubattery is less than Ure-start (410 YES), then the third comparator 314 may be outputting a logical LOW value to the latch circuit 316. Thus, the latch circuit 316 may only output a logical HIGH value to the AND gate 318 if the latch circuit 316 previously received a logical HIGH value (as discussed above at act 412) and has not since been restarted.

If the latch circuit 316 has not been restarted since Ubattery exceeded Ure-set, then the latch circuit 316 may be outputting a latched HIGH signal (424 YES). Because the second comparator 312 is outputting a logical HIGH value (422 YES), the AND gate 318 receives a logical HIGH value from both the second comparator 312 and the latch circuit 316, and outputs a logical HIGH value to the OR gate 320. The OR gate 320 thus outputs a logical HIGH value, causing the power-supply device 112 to power down. The process 400 thus continues to act 410 responsive to the AND gate 318 determining that the latch 316 is outputting a latched HIGH signal (424 YES), and the power-supply device 112 disables power to the BMS 110.

Figure 9:
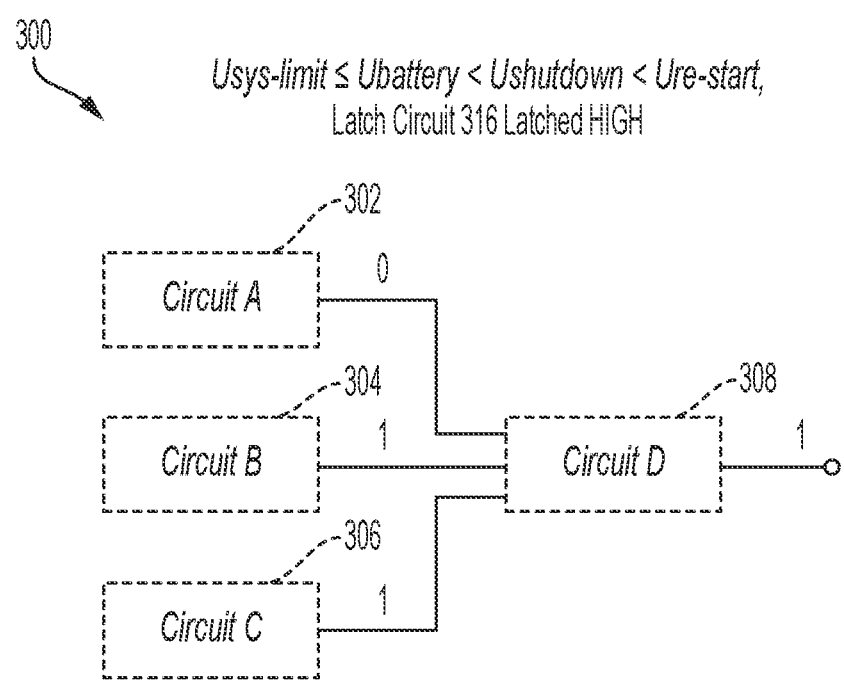
FIG. 9 illustrates a simplified block diagram of battery-management-system-control circuitry according to another example.

FIG. 9 illustrates a simplified block diagram of the BMS-control circuitry 300 in an example in which Ubattery is greater than Usys-limit but less than Ure-start and Ushutdown, and in which the latch circuit 316 is latched HIGH. The first circuit 302 outputs a logical LOW value responsive to Ubattery being greater than Usys-limit. The second circuit 304 outputs a logical HIGH value responsive to Ubattery being less than Ushutdown. The third circuit 306 outputs a logical HIGH value responsive to Ubattery being less than Ure-start, but the latch circuit 316 being latched HIGH. The fourth circuit 308 outputs a logical LOW value. FIG. 9 may illustrate a scenario in which the energy-storage device 102 is discharged such that Ubattery, initially above Ure-start, drops below Ushutdown and thereby causes the BMS 110 to shut down. FIG. 9 may represent the BMS-control circuitry 300 in the forced-restart mode of operation in which the BMS-control circuitry 300 is restarted (for example, responsive to a user input when recharging power is available to the UPS 108) after having been discharged below Ushutdown.

The BMS-control circuitry 300 may later be restarted, for example, when recharging power is available for the UPS 108 to recharge the energy-storage device 102. Returning to act 424, upon being restarted, the latch circuit 316 may not output a logical HIGH signal until a logical HIGH signal is again received from the third comparator 314. If the latch circuit 316 is not providing a latched HIGH signal (424 NO) and is therefore providing a logical LOW signal, then the AND gate 320 may output a logical LOW signal. That is, despite receiving a logical HIGH value from the second comparator 312 (422 YES), the AND gate 318 outputs a logical LOW value responsive to receiving a latched LOW signal from the latch circuit 316. The latch circuit 316 may output a logical LOW signal because, for example, the BMS-control circuitry 300 was recently restarted and Ubattery has not exceeded Ure-start since the BMS-control circuitry 300 was restarted. The OR gate 320 receives the logical LOW value from the AND gate 318 and the logical LOW value from the first comparator 310 and outputs a logical LOW value in response. The process 400 continues to act 420, and the power-supply device 112 provides output power to the BMS 110.

Figure 10:
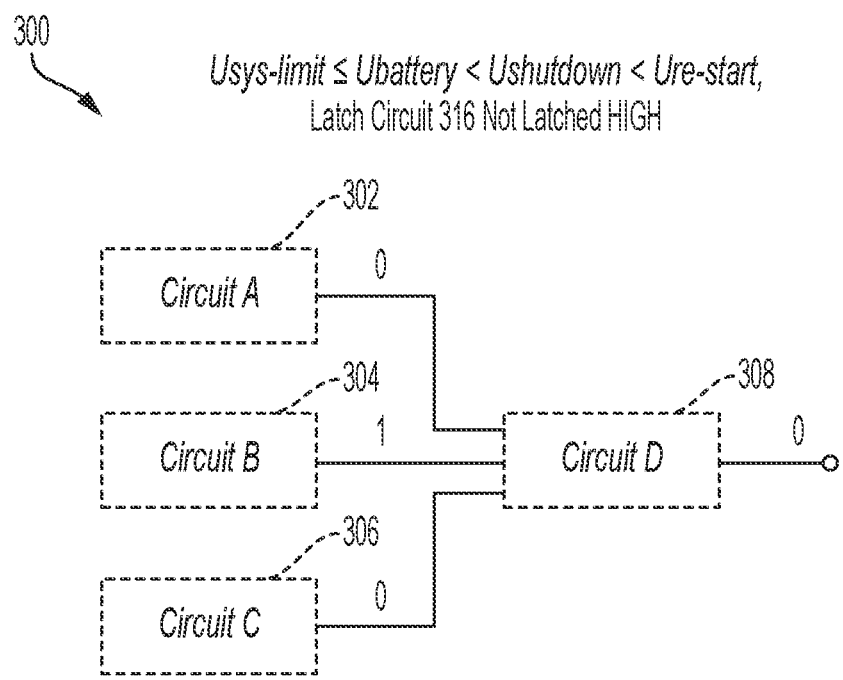
FIG. 10 illustrates a simplified block diagram of battery-management-system-control circuitry according to another example.

FIG. 10 illustrates a simplified block diagram of the BMS-control circuitry 300 in an example in which Ubattery is greater than Usys-limit but less than Ure-start and Ushutdown, and in which the latch circuit 316 is not latched HIGH. The first circuit 302 outputs a logical LOW value responsive to Ubattery being greater than Usys-limit. The second circuit 304 outputs a logical HIGH value responsive to Ubattery being less than Ushutdown. The third circuit 306 outputs a logical LOW value responsive to Ubattery being less than Ure-start and the latch circuit 316 not being latched HIGH. The fourth circuit 308 outputs a logical LOW value. FIG. 10 may represent the BMS-control circuitry 300 in a standby mode of operation in which the BMS-control circuitry 300 is about to be shut down due to Ubattery dropping below Ushutdown.

Although the latch circuit 316 may have previously been latched HIGH from receiving a logical HIGH value from the third comparator 314 responsive to Ubattery being greater than Ure-start, the latch circuit 316 may have been subsequently restarted. For example, the BMS-control circuitry 300 (and, by extension, the latch circuit 316) may be shut down due to Ubattery dropping below Ushutdown. The BMS-control circuitry 300 may be subsequently restarted because recharging power is available to the energy-storage device 102 from the UPS 108. In various examples, components of the power system 100 (including, for example, the power-supply device 112 and the BMS 110) may be configured to restart only once the recharging power is available. For example, one or more components of the power system 100 may include at least one user interface configured to restart the power system 100 responsive to receiving a user input, and the at least one user interface itself may be powered on when recharging power is available. In one example, the at least one user interface may send a start-up signal to the BMS-control circuitry 300 to power up components of the BMS-control circuitry 300 responsive to receiving the user input.

Upon being restarted, the latch circuit 316 may output a logical LOW signal and continue to do so until receiving a logical HIGH signal from the third comparator 314. If Ubattery is less than Ure-start upon being restarted, however, the third comparator 314 will not output a logical HIGH signal until the energy-storage device 102 is sufficiently recharged for Ubattery to exceed Ure-start. Accordingly, the power-supply device 112 continues to provide output power to the BMS 110 at act 418, which may enable the energy-storage device 102 to receive recharging power from the UPS 108 via the switching device 106.

The latch circuit 316 (and, by extension, the third circuit 306) may therefore be understood to prepare the fourth circuit 308 to shut down the power-supply device 112 once the second circuit 304 determines that Ubattery has dropped below Ushutdown during discharge. Once the latch circuit 316 is restarted (for example, because recharging power is available), the latch circuit 316 may output a logical LOW signal until Ubattery exceeds Ure-start, causing the fourth circuit 308 to maintain the power-supply device 112 powered up while the energy-storage device 102 is recharged. Once Ubattery again exceeds Ure-start, the latch circuit 316 is primed to shut the BMS-control circuitry 300 down again if Ubattery drops below Ushutdown. The latch circuit 316 thus enables the BMS-control circuitry 300 to be powered down when Ubattery drops below Ushutdown during discharging, and enables the BMS-control circuitry 300 to remain powered up after the BMS-control circuitry 300 is restarted and Ubattery is less than Ushutdown.

As discussed above, the process 400 is provided for purposes of explanation, and operation of the BMS-control circuitry 114 is not limited to the example of the process 400. For example, where the process 400 is executed in connection with the BMS-control circuitry 300, acts of the process 400 may not be executed sequentially and/or may not be executed in the order provided above. As appreciated by one of ordinary skill in the art, for example, the comparators 310, 312, 314 may continuously compare the values at their respective inputs in parallel rather than sequentially executing the comparisons periodically.

The process 400 may end at act 412 after the power-supply device 112 disables output power to the BMS 110 at act 410, causing the BMS 110 to shut down and the switching device 106 to open. In various examples, the power system 100 may remain powered down until a user restarts the power system 100. A user may restart the power system 100 by interacting with a user interface coupled to one or more of the components of the power system 100. For example, where the UPS 200 is an example of the UPS 108, the communication interfaces 220 may include one or more user-interface elements (including, for example, a button, a switch, a touch screen, and/or other user-interface elements) to enable a user to restart the power system 100. In some examples, the one or more user-interface elements include a button that, when pressed by a user, causes the UPS 108 to start up.

As discussed above, the power-supply device 112 may receive power from the UPS 108. The UPS 108 may, in response to receiving the user input, send a start-up signal to one or both of the BMS 110 and/or the power-supply device 112, and/or may provide power to the power-supply device 112 to power up the power-supply device 112 and the BMS 110. In various examples, the UPS 108 may only be capable of sending the start-up signal if the UPS 108 has access to mains power (for example, via the input 202) at least because the switching device 106 may still be open, thereby limiting access to backup power (for example, via the energy-storage-device interface 210). Upon being restarted, the BMS-control circuitry 114 may execute the process 400 and, in some examples, enable the switching device 106 to close (for example, at act 420) to enable the energy-storage device 102 to be recharged by the UPS 108.

As discussed above, in executing the process 400, the BMS-control circuitry 114 may be implemented at least in part by the BMS-control circuitry 300. In other examples, the BMS-control circuitry 114 may include additional and/or different components, such as one or more controllers. One or more acts of the process 400 may be executed by the one or more controllers executing the one or more acts via software. For example, act 408 may include the one or more controllers executing, in software, a comparison between Ubattery and Usys-limit and disabling the output power of the power-supply device 112 if Ubattery is determined by the one or more controllers to be below Usys-limit. Similar principles apply to other acts of the process 400.

The power system 100 may include additional components in some examples. For example, the power system 100 may include one or more fuses, circuit breakers, controllers, or other components which are omitted for purposes of clarity. Furthermore, components of the power system 100 may be arranged differently in some examples. For example, the sensors 104 may be positioned differently in some examples, such as by being placed between the switching device 106 and the UPS 108 in addition to, or in lieu of, being positioned between the energy-storage device 102 and the switching device 106. Components of the power system 100 may also be combined in some examples. For example, the power-supply device 112 and/or the BMS 100 may be combined and/or may be components of the UPS 108 in some examples.

Various controllers, such as the controller 212 (and, in some examples, one or more controllers configured to execute one or more acts of the process 400), may execute various operations discussed above. Using data stored in associated memory and/or storage, the controllers may also execute one or more instructions stored on one or more non-transitory computer-readable media, which the controllers may include and/or be coupled to, that may result in manipulated data. In some examples, the controllers may include one or more processors or other types of controllers. In one example, the controllers are or include at least one processor. In another example, the controllers perform at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power system comprising:
 a power-supply device having an output, the power-supply device being configured to provide output power to the output of the power-supply device; and
 control circuitry configured to
  receive voltage information indicative of a voltage of a battery,
  determine that the voltage of the battery is above a first voltage threshold,
  activate a shutdown signal responsive to determining that the voltage of the battery is above the first voltage threshold,
  determine that the voltage of the battery is below a second voltage threshold, the second voltage threshold being less than the first voltage threshold,
  control the power-supply device to disable the output power to the output of the power-supply device responsive to determining that the voltage of the battery is below the second voltage threshold and that the shutdown signal is activated, and
  control the power-supply device to provide the output power to the output of the power-supply device responsive to determining that the voltage of the battery is below the second voltage threshold and that the shutdown signal is not activated.

2. The power system of claim 1, wherein the control circuitry is further configured to
determine that the voltage of the battery is below a third voltage threshold, the third voltage threshold being less than the second voltage threshold, and
control the power-supply device to disable the output power to the output of the power-supply device responsive to determining that the voltage of the battery is below the third voltage threshold.

3. The power system of claim 1, wherein the control circuitry is further configured to deactivate the shutdown signal responsive to controlling the power-supply device to disable the output power to the output of the power-supply device.

4. The power system of claim 3, wherein the control circuitry is further configured to
receive a start-up signal, and
determine whether the voltage of the battery is above the first voltage threshold responsive to receiving the start-up signal.

5. The power system of claim 4, wherein the control circuitry is further configured to maintain the shutdown signal deactivated responsive to determining that the voltage of the battery is below the first voltage threshold.

6. The power system of claim 1, wherein the control circuitry includes a first comparator configured to compare the voltage of the battery to the first voltage threshold.

7. The power system of claim 6, wherein the control circuitry includes a latch circuit having an input coupled to an output of the first comparator, and an output.

8. The power system of claim 7, wherein the first comparator is configured to provide a first shutdown signal to the latch circuit responsive to determining that the voltage of the battery is above the first voltage threshold, wherein the latch circuit is configured to output a latched shutdown signal at the output of the latch circuit responsive to receiving the first shutdown signal from the first comparator, and wherein activating the shutdown signal includes outputting the latched shutdown signal.

9. The power system of claim 7, wherein the control circuitry includes an AND gate having a first input coupled to the output of the latch circuit, and a second input.

10. The power system of claim 9, wherein the control circuitry includes a second comparator having an output configured to be coupled to the second input of the AND gate, and wherein the second comparator is configured to provide a second shutdown signal to the second input of the AND gate responsive to determining that the voltage of the battery is less than the second voltage threshold.

11. The power system of claim 10, wherein the AND gate is configured to control the power-supply device to disable the output power to the output of the power-supply device responsive to receiving a latched shutdown signal from the first comparator and receiving the second shutdown signal from the second comparator.

12. The power system of claim 11, wherein the control circuitry includes an OR gate having a first input coupled to an output of the AND gate, and a second input.

13. The power system of claim 12, wherein the control circuitry includes a third comparator configured to compare the voltage of the battery to a third voltage threshold.

14. The power system of claim 13, wherein the third comparator is configured to output a third shutdown signal to the second input of the OR gate responsive to determining that the voltage of the battery is less than the third voltage threshold.

15. A non-transitory computer-readable medium storing thereon sequences of computer-executable instructions for operating a power system including a power-supply device having an output, the power-supply device being configured to provide output power to the output of the power-supply device, the sequences of computer-executable instructions including instructions that instruct at least one processor to:
receive voltage information indicative of a voltage of a battery;
determine that the voltage of the battery is above a first voltage threshold;
activate a shutdown signal responsive to determining that the voltage of the battery is above the first voltage threshold;
determine that the voltage of the battery is below a second voltage threshold, the second voltage threshold being less than the first voltage threshold;
control the power-supply device to disable the output power to the output of the power-supply device responsive to determining that the voltage of the battery is below the second voltage threshold and that the shutdown signal is activated; and
control the power-supply device to provide the output power to the output of the power-supply device responsive to determining that the voltage of the battery is below the second voltage threshold and that the shutdown signal is not activated.

16. The non-transitory computer-readable medium of claim 15, wherein the instructions further instruct the at least one processor to
determine that the voltage of the battery is below a third voltage threshold, the third voltage threshold being less than the second voltage threshold, and
control the power-supply device to disable the output power to the output of the power-supply device responsive to determining that the voltage of the battery is below the third voltage threshold.

17. The non-transitory computer-readable medium of claim 15, wherein the instructions further instruct the at least one processor to deactivate the shutdown signal responsive to controlling the power-supply device to disable the output power to the output of the power-supply device.

18. The non-transitory computer-readable medium of claim 17, wherein the instructions further instruct the at least one processor to
receive a start-up signal, and
determine whether the voltage of the battery is above the first voltage threshold responsive to receiving the start-up signal.

19. The non-transitory computer-readable medium of claim 18, wherein the instructions further instruct the at least one processor to maintain the shutdown signal deactivated responsive to determining that the voltage of the battery is below the first voltage threshold.

20. A method of operating a power-supply system having a power-supply device and being configured to provide output power to an output of the power-supply device, the method comprising:
receiving voltage information indicative of a voltage of a battery;
determining that the voltage of the battery is above a first voltage threshold;

activating a shutdown signal responsive to determining that the voltage of the battery is above the first voltage threshold;

determining that the voltage of the battery is below a second voltage threshold, the second voltage threshold being less than the first voltage threshold;

controlling the power-supply device to disable the output power to the output of the power-supply device responsive to determining that the voltage of the battery is below the second voltage threshold and that the shutdown signal is activated; and controlling the power-supply device to provide the output power to the output of the power-supply device responsive to determining that the voltage of the battery is below the second voltage threshold and that the shutdown signal is not activated.

* * * * *